(12) United States Patent
Spoerl et al.

(10) Patent No.: US 10,150,180 B2
(45) Date of Patent: Dec. 11, 2018

(54) LASER MACHINING HEAD

(71) Applicant: PRECITEC GMBH & CO. KG, Gaggenau-Bad Rotenfels (DE)

(72) Inventors: Georg Spoerl, Rheinstetten (DE); Christian Loose, Gaggenau (DE)

(73) Assignee: PRECITEC GMBH & CO. KG, Rotenfels (DE)

( * ) Notice: Subject to any disclaimer, the term of this patent is extended or adjusted under 35 U.S.C. 154(b) by 0 days.

(21) Appl. No.: 15/111,107

(22) PCT Filed: Feb. 5, 2015

(86) PCT No.: PCT/EP2015/052456
§ 371 (c)(1),
(2) Date: Jul. 12, 2016

(87) PCT Pub. No.: WO2015/118088
PCT Pub. Date: Aug. 13, 2015

(65) Prior Publication Data
US 2016/0339541 A1    Nov. 24, 2016

(30) Foreign Application Priority Data

Feb. 6, 2014   (DE) .................. 10 2014 101 477

(51) Int. Cl.
*B23K 26/064* (2014.01)
*B23K 26/70* (2014.01)
*G02B 7/10* (2006.01)
*B23K 26/06* (2014.01)
(Continued)

(52) U.S. Cl.
CPC ............ *B23K 26/064* (2015.10); *B23K 26/04* (2013.01); *B23K 26/048* (2013.01); *B23K 26/06* (2013.01);
(Continued)

(58) Field of Classification Search
CPC ...... B23K 26/04; B23K 26/048; B23K 26/06; B23K 26/064; B23K 26/0665;
(Continued)

(56) References Cited

U.S. PATENT DOCUMENTS 2,706,913 A    4/1955  Trossi
4,366,722 A *  1/1983  Hasler ................ F16H 19/0622
                                                        360/267
(Continued)

FOREIGN PATENT DOCUMENTS

DE    43 17 384 A1    3/1994
DE    295 07 189 U1   6/1995
(Continued)

OTHER PUBLICATIONS

Machine translation of JPS6321617.*

*Primary Examiner* — Dana Ross
*Assistant Examiner* — Kuangyue Chen
(74) *Attorney, Agent, or Firm* — Muncy, Geissler, Olds & Lowe, PC

(57) ABSTRACT

A laser machining head for machining a workpiece with a laser beam, having a mounting, beam-shaping optics, which are mounted on the mounting such that they can be displaced in the longitudinal direction of the laser beam. In order largely to avoid contamination of the optics and in order to hold the optics securely in their adjusted position, even if high inertial forces occur as a result of higher accelerations, a belt drive is provided for displacing the optics.

13 Claims, 2 Drawing Sheets

(51) Int. Cl.
*B23K 26/04* (2014.01)
*B23K 26/14* (2014.01)
*G02B 7/04* (2006.01)

(52) U.S. Cl.
CPC ...... *B23K 26/0665* (2013.01); *B23K 26/1476* (2013.01); *B23K 26/702* (2015.10); *G02B 7/04* (2013.01); *G02B 7/102* (2013.01)

(58) Field of Classification Search
CPC .... B23K 26/1476; B23K 26/702; G02B 7/04; G02B 7/102
USPC .......................................................... 359/823
See application file for complete search history.

(56) References Cited

U.S. PATENT DOCUMENTS

| | | | |
|---|---|---|---|
| 5,157,444 A * | 10/1992 | Mori | B65G 39/16 198/806 |
| 5,546,238 A | 8/1996 | Devenyi | |
| 2011/0066291 A1 * | 3/2011 | Morita | G05B 19/19 700/279 |
| 2011/0075274 A1 * | 3/2011 | Spoerl | B23K 26/02 359/814 |
| 2014/0349797 A1 * | 11/2014 | Kwak | G03G 15/162 474/237 |

FOREIGN PATENT DOCUMENTS

| | | |
|---|---|---|
| DE | 196 22 413 A1 | 12/1997 |
| DE | 19622413 A1 | 12/1997 |
| DE | 106 28 857 A1 | 1/1998 |
| DE | 20 2009 012 924 U1 | 1/2010 |
| JP | 63-21617 A | 1/1988 |
| JP | S6321617 A | 1/1988 |
| RU | 2386523 C1 | 4/2010 |
| SU | 1527602 A1 | 12/1989 |
| SU | 1757827 A1 | 8/1992 |
| WO | WO 2013048019 * | 4/2013 |

* cited by examiner

LASER MACHINING HEAD

BACKGROUND OF THE INVENTION

Field of the Invention

The invention relates to a laser machining head, in which beam-shaping optics, in particular focusing optics, collimator optics or zoom optics, are displaceably or adjustably held.

Brief Description of the Related Art

During the machining of a workpiece by means of a laser machining head, in particular during laser cutting or welding, a laser machining head is usually provided with a housing in which focusing optics, collimator optics, zoom optics or are arranged. A laser beam running through the laser machining head to a cutting nozzle is focused by focusing optics such that a workpiece can be machined. The optics for shaping the laser beam are held in the laser machining head in this context such that the optics are adjustable relative to the housing of the laser machining head. Here, the optics can be adjusted firstly in a plane perpendicular to the laser beam and secondly in the longitudinal direction of the laser beam.

DE 295 07 189 U1 discloses a connecting head for machining a workpiece by means of a laser beam, in which the focusing optics for the laser beam are held displaceably on a slide-in unit, which can be inserted into the housing of the connecting head. In order to displace the optics in the direction of the longitudinal axis thereof, a manual drive which operates like a spindle drive is provided here.

DE 196 22 413 discloses a cable drive as adjusting drive for positioning optics in a laser machining head. In this case, it is disadvantageous that, even with a cable diameter of only about 1 mm and bending radii of about 20 mm within the cable, abrasion is produced by friction between the individual wires. As a result, the interior of a machining head and in particular the optics therein can be contaminated.

In order to circumvent the problem of contamination of the optics in known laser machining heads, which is caused by abrasion and/or lubricants if displacement of the optics is carried out in accordance with the spindle principle or by means of a cable drive, it is already known to provide a displacement device for the optics which has a linear motor with contact-free drive.

A displacement or drive device having such a linear motor with contact-free drive (direct drive) is known from German utility model DE 20 2009 012 924 U1.

The disadvantage here is that the optics can be moved in an undesired manner and thus the focal position can be shifted if high accelerations act on the direct drive from outside, since then inertial forces can occur, which can be greater than the magnetic holding force. If this effect is to be avoided, a brake or a direct drive having greater dimensioning can be incorporated. This procedure contradicts a small overall size and the lowest possible costs.

DE 43 17 384 A1 discloses a laser machining head, the beam-shaping optics of which are displaceable in the longitudinal direction of the laser beam by a worm drive. However, as is known, this type of drive is sluggish and relatively inaccurate on account of the spontaneous play of the worm drive.

U.S. Pat. No. 5,546,238 A relates to zoom optics with a high-speed lens drive and, in order to displace the optics, shows a belt drive having a circulating belt which is led over two rolls. For displacement, the individual lens groups of the optics can be coupled as desired to the circulating belt via piezoelectric clamps. Here, the belt is led over the driving rolls without friction.

DE 196 28 857 A1 relates to a connecting head for machining a workpiece by means of a laser beam, the beam-shaping optics of which are arranged in a cartridge which can be inserted into a carrier unit in the laser machining head. In order to displace the carrier unit in the direction of the optical axis, an electrically driven geared motor is provided, the motor shaft of which extends parallel to the optical axis. Seated on the motor shaft is a drive gear for a toothed belt, which is laid around a further drive wheel which is seated firmly on a spindle in order to rotate the latter when the motor rotates. In order to displace the carrier unit, the spindle interacts with a spindle nut, which is fixedly attached to the side of the carrier unit.

SUMMARY OF THE INVENTION

Thus, the invention is based on the object of devising a laser machining head with optics held displaceably therein, in which contamination of the optics can largely be avoided and the optics can be held securely in their adjusted position, even if high inertial forces occur as a result of high accelerations.

This object is achieved by the laser machining head as claimed in claim 1.

According to the invention, therefore, a laser machining head for holding and displacing beam-shaping optics, such as focusing optics for focusing a laser beam onto a workpiece, collimator optics, which are mounted on the slide-in unit such that they can be displaced in the longitudinal direction of the laser beam, or zoom optics, has a belt drive with which the beam-shaping optics can be displaced precisely and which keeps beam-shaping optics securely in the adjusted position even if high inertial forces occur as a result of rapid movements and speed changes of the laser machining head. The belt drive provided in accordance with the invention has the advantage that, during the displacement of the optics, no sliding friction which could lead to abrasion occurs in the belt drive; instead only rolling friction, so that contaminants such as could occur in the prior art are avoided.

In order to permit automatic adjustment even during the laser machining, provision is made for the belt drive to have a belt drum which is rotatably mounted on the mounting and which can be driven by a motor, in particular by a brushless DC motor or a stepping motor.

In order to ensure reliable guidance of the optics during the displacement relative to the slide-in unit, provision is advantageously made for the optics to be held on a carriage which is mounted on the mounting such that it can be displaced in the longitudinal direction of the laser beam and which has two ends spaced apart from each other in the direction of movement, a first belt is fixed by its one end to the one end of the carriage and is wound with its other end around the belt drum and is fixed to the latter, and a second belt is fixed by its one end to the other end of the carriage and is wound with its other end around the belt drum and is fixed to the latter.

Advantageously, the first and the second belt are wound around the belt drum beside each other, seen in the axial direction of the drum, wherein a first belt is arranged between two second belts. Here, the sum of the widths of the two second belts is expediently equal to or greater than the width of the first belt, wherein the two second belts are equally wide.

As a result of the specific arrangement of the belts on the belt drum, the rotational movement of the belt drum can be converted via the belts into a precise linear displacement of the carriage driven by the belt drive, since the forces transmitted to the belt drum by the belts cancel one another out.

In order to keep the loading of the belts as low as possible during the displacement of the carriage for adjusting the optics, provision is made for the ratio of belt thickness to the belt drum radius to be less than 0.05, preferably less than 0.03, in particular less than 0.01.

In order to ensure reliable operation and long service lives of the belt drive, provision is expediently made for the first and second belts to have the same thickness, which lies in the range from 0.1 mm to 0.01 mm, preferably from 0.08 mm to 0.02 mm, in particular from 0.06 mm to 0.04 mm.

Advantageously, the first and second belts consist of steel, in particular spring steel or the like. The first and second belts can also be formed as first and second belt sections of a one-piece belt.

Furthermore, it is expedient for the mounting for supporting the optics that can be displaced in the longitudinal direction of the laser beam to be held on a slide-in unit which can be inserted into the laser machining head. In this way, rapid and simple replacement of the optics can be made possible, if this becomes necessary because of a change of focal length or damage to the optics.

BRIEF DESCRIPTION OF THE DRAWINGS

The invention will be explained in more detail below by way of example, using the drawing, in which.

DETAILED DESCRIPTION OF THE PREFERRED EMBODIMENTS

Figure 1:
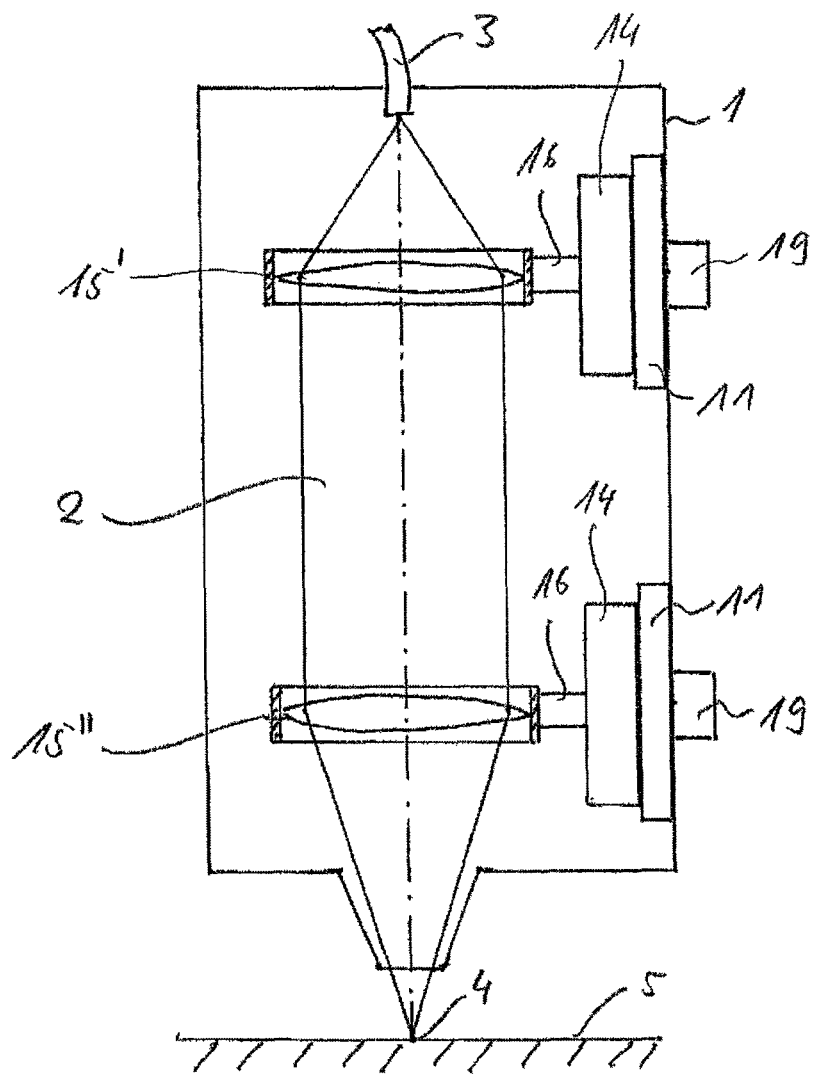
FIG. 1 shows a simplified schematic block diagram of a laser machining head according to the invention.

In the various figures of the drawing, mutually corresponding components are provided with the same designations.

As illustrated in FIG. 1, a laser machining head according to the invention has a housing 1, through which a laser beam 2 is led. In order to shape the laser beam 2 emerging from an optical fiber 3, for example, first optics 15', which are formed as collimator optics, and second optics 15" are provided, which as focusing optics focus the laser beam 2 into the interaction area 4 between laser beam 2 and workpiece 5. For the displaceable mounting of the optics 15', 15", the latter are respectively fixed via a holder 16 to a carriage 14 of a belt drive, which can be driven by a motor 19 and is displaceably guided on a mounting 11. The mounting 11 can be fixed directly in the housing 1 of the laser machining head, as illustrated in FIG. 1. However, it is also possible—as shown in FIG. 2—to provide the mounting 11 on a slide-in unit 10, which can be inserted into the laser machining head.

Instead of the collimator and focusing optics shown in FIG. 1, however, zoom optics, with which not only the focal position but also the focal length can be changed, can also be used for beam shaping.

Figure 2:
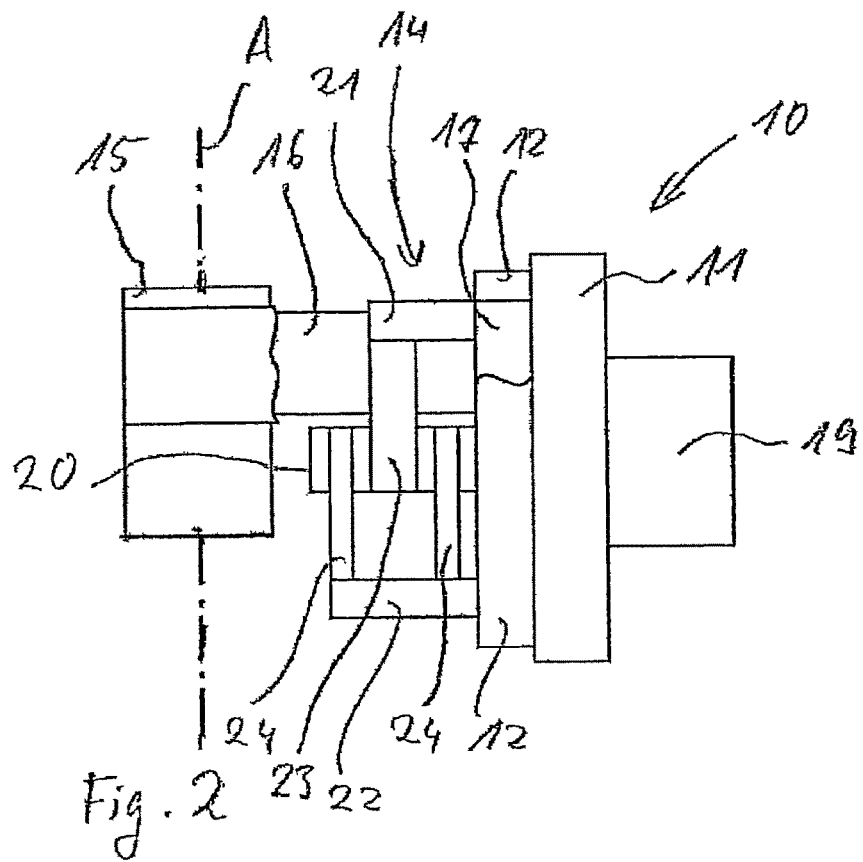
FIG. 2 shows a simplified schematic side view of a slide-in unit for the adjustable mounting of optics in the laser machining head according to the invention.
Figure 3:
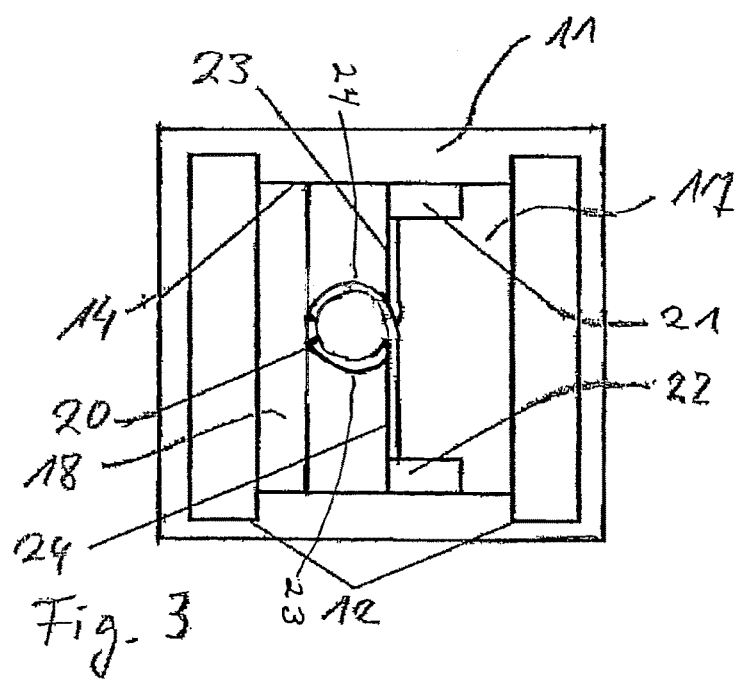
FIG. 3 shows a simplified schematic plan view of the displacement mechanism for the optics.

As illustrated in FIG. 2, the slide-in unit 10 which can be inserted into the laser machining head has the mounting 11, which is formed as a holding plate fixed to the housing 1 of the laser machining head. Provided on the mounting 11 are guide rails 12 for the carriage 14 on which optics 15 are held. The optics 15 can be, as mentioned, collimator optics for widening and collimation, that is to say for producing a widened parallel laser beam, or focusing optics which, for cutting, welding, soldering, powder application welding or the like, focus the laser beam 2 onto a workpiece 5 to be machined. As indicated schematically in FIGS. 1 and 2, the optics 15 are fixed via the holder 16 to the carriage 14, which, for example, can be formed as a holding sleeve or the like. The carriage 14 has a first and a second carriage rail 17, 18 which are guided on respective guide rails 12 on the mounting 11 and which are formed in such a way that a belt drum 20 that is arranged in a fixed location on the mounting 11 and is driven by a motor 19 can project unimpeded through the carriage 14, so that the belt drum 20 and the carriage 14 are not in each other's way. Fitted to one of the carriage rails, to the first carriage rail 17 in the exemplary embodiment illustrated, are first and second belt holders 21, 22, to which first and second belts 23, 24 are fixed by their one ends, while their respective other ends are wound around the belt drum 20 and are fixed to the latter. More precisely, the first belt 23 is fixed to one end of the carriage 14 by its one end, the upper end in FIG. 1, via the belt holder 21, while it is wound with its lower end in the clockwise direction around the belt drum 20 and is fixed to the latter. The second belt, which is formed as two second belts 24, is connected by its lower end in the drawing to the other end of the carriage 14 via the belt holder 22, while its upper end, that is to say the upper end of the two second belts 24, are led in the counterclockwise direction around the drum 20 and are fixed to the latter. The first and second belts 23, are arranged beside each other in such a way that the two second belts 24 lie on the two sides of the first belt 23. The first and second belts 23, 24 here jointly form a belt loop, which is led around the drum 20.

Figure 4A:
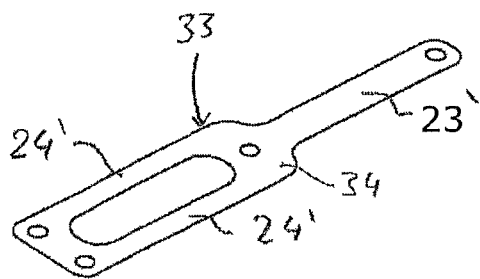
FIG. 4a shows a perspective view of a one-piece belt for a belt drive of the displacement mechanism.
Figure 4B:
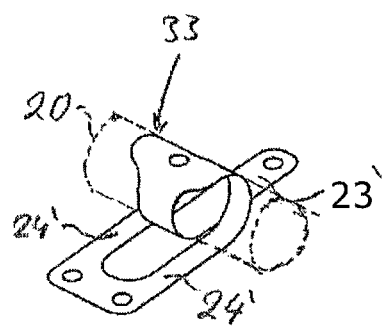
FIG. 4b shows a perspective view of the belt according to FIG. 4a in the wound-up mounting state.

As is shown in FIG. 4a, instead of the first belt and the second belts, a first belt section 23' and two second belt sections 24' of a one-piece belt 33 can be used. The first and second belt sections 23', 24' meet in the middle of the belt 33 and form a fork-like section 34 with which the belt 33 is fixed to the drum 20, as indicated in FIG. 4b.

The belts 23, 24; 33 for the belt drive, that is to say the flexible drive means which transfer the drive force of the drum 20 to the carriage 14, have a ratio of width to thickness which is greater than 50, preferably greater than 80. The belts here consist of steel, preferably spring steel, and have a thickness which lies in the range from 0.1 mm to 0.01 mm, preferably from 0.08 mm to 0.02 mm, in particular around 0.05 mm.

The belt thickness and the drum diameter should be chosen respectively such that the ratio of belt thickness to the belt drum radius is less than 0.05, preferably less than 0.03, in particular less than 0.01. If, for example, a drum diameter of 12 mm is assumed, corresponding to a drum radius of 6 mm, then the result in the case of the belt thickness of 0.05 mm is a ratio of belt thickness to bending radius of 0.0083.

If, then, the drum is rotated in the clockwise direction in FIG. 2 by the motor 19, which, for example, can be a brushless DC motor or a stepping motor, then the first belt 23 or the first belt section 23' is wound up, while the second belt, that is to say the second belts 24 or the second belt sections 24', are unwound, so that the carriage 14 moves downward in the drawing. Conversely, the carriage 14 will be moved upward if the belt drum 20 rotates in the counterclockwise direction.

Here, the position of the optics 15 is measured by means of a linear scale, not specifically illustrated. A corresponding position signal is passed onto a motor controller, which ensures that the optics 15 are positioned at the desired point.

The motor 19 should be designed such that its torque is greater than the mass to be moved multiplied by the radius of the belt drum 20. Such a motor 19 is then also capable of keeping the optics 15 in their desired position if the forces acting from outside are effected by accelerations which are up to six times the force of gravity. Depending on the direction of the acceleration, the weight of the mass to be moved by the belt drive additionally acts.

As a result of the use of a belt drive, the optics 15 can therefore be displaced to and fro between the guide rails 12 in the direction of their optical axis A relative to the mounting 11 of the slide-in unit 10, in order to adjust their position in the laser machining head in the desired way. In the case of a collimator lens, the optics 15 are displaced such that the exit surface of an optical fiber which supplies the laser light coincides with the current focus of the collimator optics, in order to image the exit surface at infinity, in order therefore to obtain a widened parallel laser beam. In the case of a focusing lens, the optics 15 are displaced such that the laser focus has the desired position in relation to the workpiece surface. If displacement of the focal point occurs because of warming of the lens, in particular in the case of focusing optics, then the optics 15 can be tracked via the belt drive driven by the motor 19 without the working process needing to be substantially interrupted.

A substantial advantage of the belt drive used in accordance with the invention is that the ratio of flexible drive thickness, that is to say the thickness of the belt, to the bending radius is made smaller and can therefore be improved. Therefore, it is also possible to reduce the loading of the belts under tension as a result of winding and unwinding. Since no wear mechanism similar to the cable occurs within the belts, there is also no risk of contamination of the lenses in the laser machining head either. Furthermore, it is important that no kind of sliding friction but only rolling friction, which is virtually abrasion-free, occurs between the belts and the belt drum.

The invention claimed is:

1. A laser machining head for machining a workpiece with a laser beam, having a mounting, beam-shaping optics, which are held on a carriage which is mounted on the mounting such that they can be displaced in a longitudinal direction of the laser beam and which has two ends spaced apart from each other in a direction of movement, and a belt drum for displacing the beam-shaping optics, which is rotatably mounted on the mounting and which can be driven by a motor, wherein the ratio of belt thickness to a belt drum radius is less than 0.05, wherein a first belt is fixed by its one end to the one end of the carriage and is wound with its other end around the belt drum and is fixed to the belt drum. and a second belt is fixed by its one end to another end of the carriage and is wound with its other end around the belt drum and is fixed to the belt drum, wherein the first belt is arranged between two second belts.

2. The laser machining head as claimed in claim 1, wherein the motor is a brushless DC motor or a stepping motor.

3. The laser machining head as claimed in claim 1, wherein a ratio of belt thickness to the belt drum radius is less than 0.03.

4. The laser machining head as claimed in claim 1, wherein the first and the second belt are wound around the belt drum beside each other, seen in an axial direction of the drum.

5. The laser machining head as claimed in claim 1, wherein a sum of the widths of the two second belts is equal to or greater than the width of the first belt.

6. The laser machining head as claimed in claim 1, wherein the two second belts are equally wide.

7. The laser machining head as claimed in claim 1, wherein the first and second belts have a same thickness, which lies in a range from 0.1 mm to 0.01 mm.

8. The laser machining head as claimed in claim 1, wherein the first and second belts consist of steel, in particular spring steel.

9. The laser machining head as claimed in claim 1, wherein the first and second belts are formed as first and second belt sections of a one-piece belt.

10. The laser machining head as claimed in claim 1, wherein the mounting for supporting the optics that can be displaced in the longitudinal direction of the laser beam is held on a slide-in unit which can be inserted into the laser machining head.

11. The laser machining head as claimed in claim 1, wherein a ratio of belt thickness to the belt drum radius is less than 0.01.

12. The laser machining head as claimed in claim 1, wherein the first and second belts have a same thickness, which lies in a range from 0.08 mm to 0.02 mm.

13. The laser machining head as claimed in claim 1, wherein the first and second belts have a same thickness, which lies in a range from 0.06 mm to 0.04 mm.

\* \* \* \* \*